May 29, 1945.  S. C. HURLEY, JR  2,377,154
CHUTE
Filed July 16, 1943
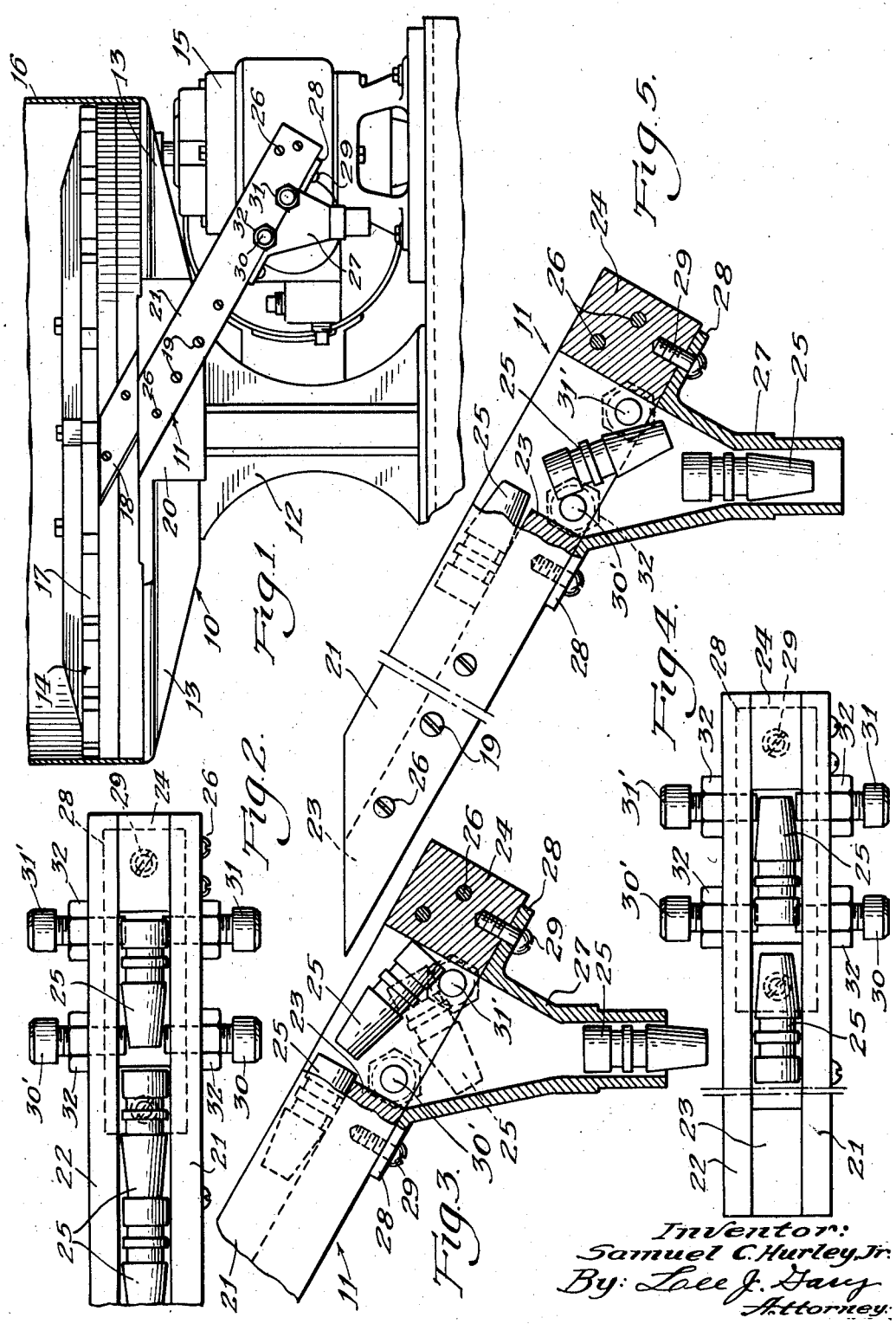
Inventor:
Samuel C. Hurley, Jr.
By: Lee J. Gary
Attorney.

UNITED STATES PATENT OFFICE 2,377,154

CHUTE

Samuel C. Hurley, Jr., Danville, Ill.

Application July 16, 1943, Serial No. 494,936

8 Claims. (Cl. 193—43)

This invention relates to a gravity delivery chute provided with means for orienting the direction of delivery of articles therefrom with the same end downward and forward irrespective of whether or not they were so introduced thereto.

More specifically my invention relates to a gravity chute for receiving elongated generally cylindrical unit articles, such as projectiles or cores and the like, formed with a tapered end or end portion of relatively smaller diameter than the opposed end portion, and for discharging such articles in seriatim with the tapered or reduced end forwardly, the chute being provided with means adjacent a delivery opening therefrom for causing the articles to be so selectively oriented.

The chute of my present invention is adapted for use in conjunction with a hopper such as that set forth in my co-pending application, Serial No. 483,904, filed April 21, 1943, and since abandoned, or a similar device which is adapted to receive the articles in heterogeneous arrangement and to successively deliver individual units to the delivery chute which extends therefrom.

Projectiles or armor piercing shell or cores, such as for example of 30, 50 or the like small caliber, are generally made on screw machines and are collected in trays or pans from that operation. They may thereafter be subjected to heat treating at which time the cores or projectiles are handled in a gross manner which renders it impossible to maintain them in the same orientation as delivered from the screw machine. Likewise, after the original machining operation the articles may have been subjected to washing in a drum or similar container making it impossible to maintain them in position in a direction in which they were delivered from the original operation. However, for the purpose of subsequent operations such as centerless grinding of the body diameter, milling or grinding of the boat-tail end of the projectile or core, hand inspection of given dimensions of the core, automatic inspection of given dimensions thereof, or bringing the projectiles into a grinder for overall grinding or correction grinding and the like operations, it is necessary that the projectiles be delivered individually and successively and all oriented in a single direction.

My aforesaid co-pending application sets forth a novel hopper adapted to receive projectiles of the class herein set forth in a heterogeneous or mixed arrangement, and to deliver them therefrom individually and successively and in an orientated manner, that is, the blunt or boat-tail end first, the delivery chute being characterized by including means for orienting the projectiles so that they are delivered in such manner from a funnel thereof and whereby the projectiles may be fed or thereafter handled in such orderly arrangement in the next successive operation.

The present invention relates to a delivery chute for such hopper having a similar orienting function but which causes the projectiles or cores to be delivered with the end of tapered or reduced diameter first.

Other objects and advantages relate to details of construction which will be apparent from a consideration of the following specification and drawing, wherein:

Fig. 1 is a fragmentary elevational view, with parts in section, of a sorting hopper illustrating my delivery chute in operative association therewith.

Fig. 2 is an enlarged detailed plan view of the lower end of my delivery chute illustrating the orientation means and further diagrammatically illustrating the passage of an article such as a dowel core coming down the chute, with the end of the large diameter forwardly.

Fig. 3 is a side elevation of the portion of the chute illustrated in Fig. 2 with parts in section, diagrammatically illustrating the orientation of an article which has been delivered with the end of the large diameter first down the delivery chute, and illustrating the selective abutment and orientation means whereby the article is caused to be delivered into and through the funnel with its tapered end first.

Fig. 4 is a view similar to that of Fig. 2 diagrammatically illustrating the passage of the article coming down the delivery chute with the tapered end first.

Fig. 5 is a view similar to Fig. 3 diagrammatically illustrating the orientation of the article which has been delivered tapered end first down the delivery chute, and is permitted to continue forwardly and downwardly in a generally continuous direction.

Referring to the drawing, Fig. 1 illustrates a sorting hopper, generally designated by the reference numeral 10, adapted to receive the articles in a heterogeneous or mixed arrangement and to deliver them therefrom individually and successively to my delivery chute, generally indicated by the reference numeral 11, wherein they are directionally oriented.

The hopper 10, which does not form a part of the present invention, generally comprises a standard 12, provided with arms 13, a rotatably mounted feed plate 14 driven through a motor 15, and a hopper side plate 16 forming a chamber about and above the feed plate 14. The feed plate 14 is slotted at its peripheral edge to provide elongated circumferentially extending slots 17 opening to the peripheral edge of the feed plate 14, the length and width of the slots being such as to accommodate a single article or core of a given dimension or caliber and to deliver the articles therefrom individually and successively to the chute entranceway 18 the mouth of which extends tangentially from the slotted peripheral portion of the feed plate 14. The chute entrance element 18 extends downwardly and is inclined in a generally forward direction to the movement of the articles when the feed plate 14 is rotated in a counter-clockwise direction. It will be understood, of course, that the feed plate 14 may be operated in a clockwise direction in which event the chute entrance-way 18 may be inclined in a reverse direction. The chute 11 is inclined in a direction generally continuous with the incline of the chute entrance 18 and is secured by means of the screws 19 to a planar surface or apron 20 extending from one of the hopper arms. It is to be understood that the illustration of Fig. 1 in the foregoing description of the sorting hopper is for the purpose of generally indicating the environment and operative association of the delivery chute of the present invention with a hopper, such as that set forth in greater detail in my aforementioned co-pending application, Serial No. 483,904, or a device of similar function.

The delivery chute of the present invention comprises a pair of side walls 21 and 22, a bottom 23 extending between the side walls and maintaining them spaced a distance substantially equal to the largest diameter of an article to be delivered by the chute and to thereby laterally confine individual units. The upper end of the chute assembly 11 is open, and the upper end portions of the side walls 21 and 22 and the bottom 23 are cut at an oblique angle so as to permit the chute 11 to be mounted adjacent to the entrance element 18 on the apron 20 of the hopper 12 in a downwardly inclined direction continuous with the incline of the element 18. The lower end of the chute assembly is closed by the end wall 24, and the lower end of the bottom 23 terminates in spaced relation to the end wall 24 a distance substantially equal to or slightly greater than the length of one of the articles to be delivered by the chute, such as the illustrated dowel cores 25. The chute assembly may be secured together by means of screws 26, or any other suitable means. A generally downwardly depending funnel 27 is secured by means of flanges 28 and screws 29 to the lower face of the chute assembly and in embracing engagement over the resulting aperture between the lower terminal end of the bottom 23 and end wall 24.

Extending in threaded engagement through the side walls 21 and 22 are two pairs of screws, one pair 30, 31' extending adjacent to the terminal end of the bottom 23, and the other pair 31, 31' extending adjacent to the end wall 24. These pairs of screws project a limited distance into the discharge opening between the end of bottom 23 and end wall 24 and slightly below the plane of the path of movement of the articles as they are carried forward by their momentum after leaving the surface of the bottom member 23. Each pair of screws are in axial alignment and the distance between the aligned axis of each pair of screws is less than the length of an article 25. The screws project inwardly of the side walls to an extent such that the distance between the inner ends of each pair of screws is less than the diameter of the larger end portion of the articles 25 and greater than that of the smaller or tapered end portion of the article. The respective screws after adjustment as described are fixed in position by means of the lock nuts 32.

Thus, for example, as illustrated in Figs. 2 and 3, when a core descends the chute 11 with its end portion of greatest diameter forwardly, its momentum carries it over the inward projection of the screw pairs, and since the diameter of the wide end is greater than the distance between the projecting ends of the screws 31, 31', it is momentarily pivotally supported by the projections while the tapered end is permitted to by-pass the projections of the screw pair 30, 30', such pivotal action causing the tapered end of the core 25 to descend first and then downwardly and forwardly with its tapered end first through the funnel 27.

Figs. 4 and 5 illustrate the passage of a core 25 with its tapered end forwardly down the chute so that as it descends by its momentum to the chute discharging opening, the tapered end by-passes the projections of the screw pair 31, 31', while causing the wider end to pivot about the projections of the screws 30, 31', and thus again the core 25 is caused to descend through the discharge opening and into the funnel 27 with the tapered end first and downwardly.

It will thus be seen from the foregoing that although I have illustrated and described the preferred form of my selective abutment and orientation means, various modifications in the details thereof within the scope of my invention will be evident to those skilled in the art. However, it will be evident that by means of the illustrated construction the screw pairs may be adjusted for wear or the accommodation of articles of minor variation in diameter.

It will also be evident that although as shown and described my novel chute is employed for the selective orientation of delivery of dowel cores, other similar articles may be handled such as projectiles having a more tapered or ogival end and a boat tail end of lesser taper, whereby such articles may be delivered through the chute and out of the funnel with the end of greatest taper or smallest diameter or section first and downwardly and forwardly irrespective of the endwise direction in which they were delivered from the sorting hopper to the delivery chute entrance.

I claim as my invention:

1. An inclined gravity chute for receiving elongated generally cylindrical unit articles formed with one end portion of relatively smaller diameter than the opposed end portion and for discharging said articles in seriatim in a uniformly oriented manner, said chute defining a laterally confining path of travel for said unit articles and being formed with a terminal base discharge opening, and selective abutment means extending into the path of movement of said articles adjacent to and in a plane beneath the plane of said opening adapted to permit by-pass of only the end portion of relatively smaller diameter of said articles and to thereby cause them to be downwardly discharged with said end forwardly.

2. An inclined gravity chute for receiving elongated generally cylindrical unit articles formed with one end portion of relatively smaller diameter than the opposed end portion and for discharging said articles in seriatim in a uniformly oriented manner comprising a pair of side walls to laterally confine said units, a terminal end wall, and a bottom extending between the side walls and terminating short of the end wall a distance substantially equal to the length of one of said articles providing a discharge opening, and selective abutment means extending into the path of movement of said articles adjacent to and beneath the plane of said opening adapted to permit by-pass of only the end portion of relatively smaller diameter of said articles and to thereby cause them to be downwardly discharged with said end forwardly.

3. An inclined gravity chute for receiving elongated generally cylindrical unit articles formed with one end portion of relatively smaller diameter than the opposed end portion and for discharging said articles in seriatim in a uniformly oriented manner comprising a pair of side walls to laterally confine said units, a terminal end wall, and a bottom extending between the side walls and terminating short of the end wall a distance substantially equal to the length of one of said articles providing a discharge opening, and selective abutment means extending into the path of movement of said articles adjacent to and beneath the plane of said opening adapted to permit by-pass of only the end portion of relatively smaller diameter of said articles and to thereby cause them to be downwardly discharged with said end forwardly, said abutment means comprising projections extending a limited distance between said walls adjacent the lower terminal end of the bottom and adjacent the end wall whereby pivotal support is provided for the larger end only of said articles.

4. An inclined gravity chute for receiving elongated generally cylindrical unit articles formed with one end portion of relatively smaller diameter than the opposed end portion and for discharging said articles in seriatim in a uniformly oriented manner comprising a pair of side walls to laterally confine said units, a terminal end wall, and a bottom extending between the side walls and terminating short of the end wall a distance substantially equal to the length of one of said articles providing a discharge opening, and selective abutment means extending into the path of movement of said articles adjacent to and beneath the plane of said opening adapted to permit by-pass of only the end portion of relatively smaller diameter of said articles and to thereby cause them to be downwardly discharged with said end forwardly, said abutment means comprising a pair of opposed projections extending from the inner faces of the side walls adjacent the lower terminus of said bottom and a like pair of projections adjacent said end wall, the distance between each pair of projections being less than the diameter of the larger end portion of the articles and greater than that of the smaller end portion.

5. A gravity chute of the class described for receiving elongated generally cylindrical unit articles formed with one end portion of relatively smaller diameter than the opposed end portion and for discharging said articles in seriatim uniformly with the end of reduced section forward comprising a pair of side walls to laterally confine said articles, a terminal end wall, a bottom extending between the side walls and terminating in spaced relationship to the end wall a distance substantially equal to the length of one of said articles providing a discharge opening, a discharge funnel embracing said opening, a pair of opposed projections extending from the side walls adjacent the lower end of the chute bottom and a like pair of projections extending from the side walls adjacent the end wall, all of said projections extending into said discharge opening adjacent to and beneath the plane of travel of said articles, the distance between each pair of projections being less than the diameter of the larger end portion of said articles and greater than that of their smaller end portions.

6. An inclined gravity chute for orienting unit articles having one end of a larger cross-section than the other comprising a passageway discharging terminally into an orienting zone, said orienting zone comprising an end wall and selective abutment means extending into the path of movement of said article adjacent to the end in a plane beneath that at which said passageway opens into said zone, said abutment means adapted to permit by-pass of only the end portion of relatively smaller diameter of said articles and thereby causing them to be discharged with said end forward.

7. An inclined gravity chute for receiving articles formed with one end of relatively smaller cross-section than the opposite end which comprises a feeding chute terminating in an orienting zone comprising a terminal end wall and selective abutment means extending into the path of movement of said article adjacent to and in a plane beneath the plane of said feeding chute, one of said means being adjacent the end wall and the other adjacent the feeding chute opening, said abutment means being adapted to permit by-pass of only the end portion of smaller cross-section of said article.

8. An inclined gravity chute for orienting unit articles with one end of smaller cross-section than the other comprising a feeding chute to define the longitudinal motion of said units, said chute discharging into an orienting zone comprising a terminal end wall, a plurality of adjustable selective abutment means extending into the path of movement of said articles in a plane beneath the plane of the opening of said chute into said zone, one of said abutment means being adjacent the end wall and the other adjacent the opening of said chute, the distance between said abutment means being less than the length of one of said articles, said abutment means being adapted to permit by-pass only of the portion of said article of smaller cross-section.

SAMUEL C. HURLEY, Jr.